Feb. 3, 1925.                                                    1,525,400
J. J. KILBRIDE
ATTACHMENT FOR MOTOR VEHICLES
Filed Oct. 28, 1924            2 Sheets-Sheet 1

WITNESSES:
Cris Peinle
Hugh H Ott

INVENTOR,
John J. Kilbride
BY Munn Co
ATTORNEYS.

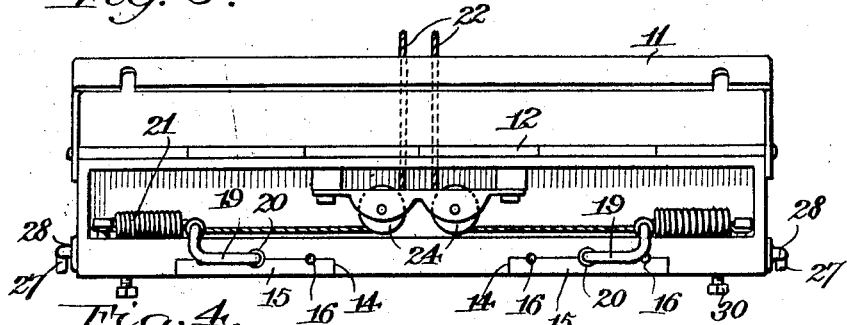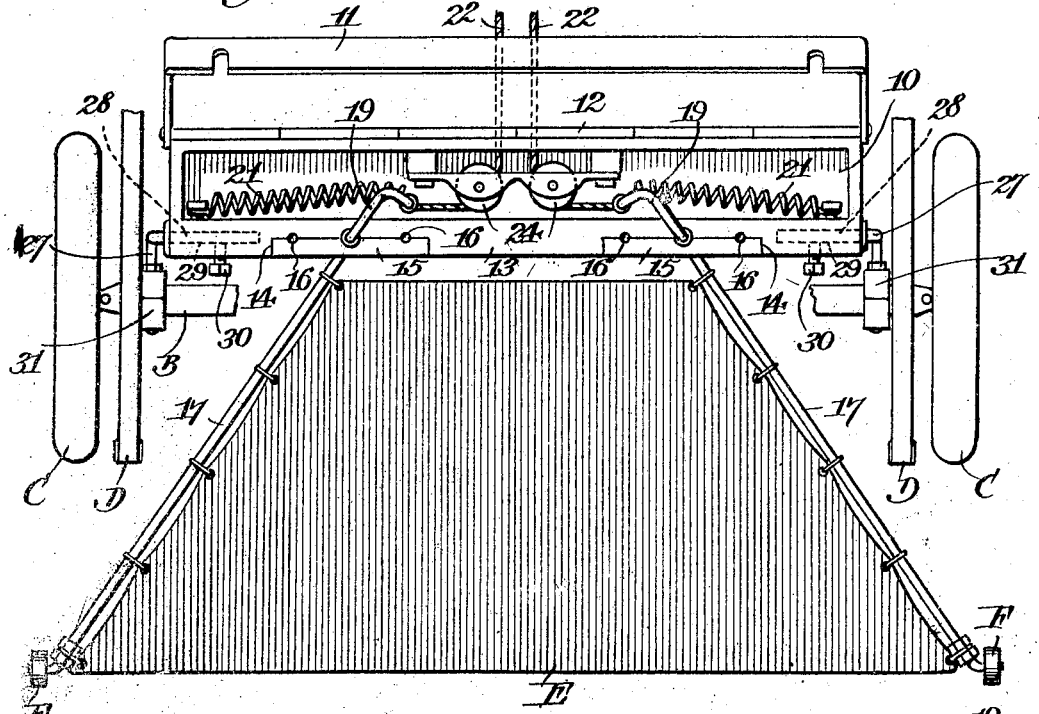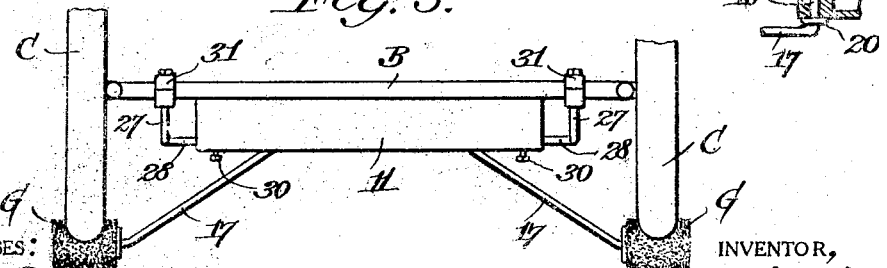

Patented Feb. 3, 1925.

1,525,400

UNITED STATES PATENT OFFICE.

JOHN J. KILBRIDE, OF NEW YORK, N. Y.

ATTACHMENT FOR MOTOR VEHICLES.

Application filed October 28, 1924. Serial No. 746,449.

*To all whom it may concern:*

Be it known that I, JOHN J. KILBRIDE, a citizen of the United States of America, and resident of the city of New York, borough of Manhattan, in the county of New York and State of New York, have invented a new and Improved Attachment for Motor Vehicles, of which the following is a full, clear, and exact description.

This invention has relation to attachments for motor vehicles and has particular reference to a collapsible or foldable means for supporting protective devices from the forward end of a motor vehicle, such as a fender for the protection of pedestrians or brushes for clearing the roadway in advance of the tires of glass or other sharp objects.

One of the outstanding objects of the present invention is to provide an attachment of the character described which is capable of manual operation to bring the same to its active position in an emergency.

A further object of the invention is to provide an attachment of the character described which is capable of ready application to practically all standard makes of motor vehicles without the necessity of altering the same.

The invention furthermore contemplates an attachment of the character set forth which is comparatively simple in its construction, inexpensive to manufacture and install and which is highly efficient in its purpose.

With the above recited and other objects the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 3 is a fragmentary plan view of the attachment with the housing cover opened to disclose the interior mechanism and showing the same in its inactive position.

Figure 4 is a similar view with the device in its active position.

Figure 1:
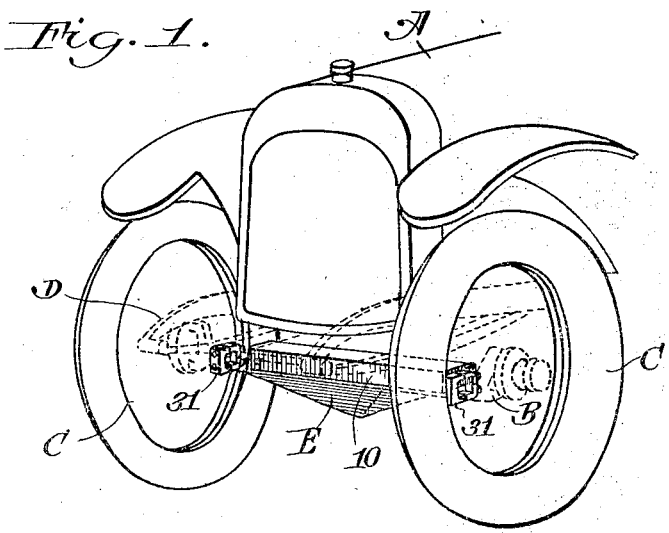
Figure 1 is a perspective view of the forward portion of a motor vehicle and illustrating the same equipped with an attachment constructed in accordance with the invention.

Figure 4ª is a sectional view on the line *a—a* of Figure 4.

Figure 5 is a fragmentary plan view illustrating an alternative use of the collapsible supporting device.

Referring to the drawings by characters of reference A designates a motor vehicle of any standard type, B the front axle thereof and C the front wheels. In the present instance the attachment is shown as supported from the front axle B, in rear thereof and between the springs D. It is however to be understood that the device may be supported in any other suitable manner without in any way departing from the spirit or scope of the invention. The attachment consists essentially of a box-like housing 10 which is open at its upper side and closed by means of a cover 11 hinged thereto as at 12. The front wall 13 of the housing is recessed as at 14 adjacent its opposite ends to receive removable blocks 15. The innermost faces of the blocks 15 and recess 14 are provided with complementary vertical semi-circular bearing grooves which combine to produce a plurality of laterally spaced vertical bearing openings 16. A pair of supporting arms 17 for the protective devices are provided and each bearing arm is formed with a vertical shank 18 at its inner end which projects upwardly therefrom and is provided with a rearwardly extending lever arm 19. The shanks 18 at their juncture are formed with annular enlarged beads 20 which are spaced apart a distance equal to the height of the front wall 13 and the blocks 15 so that they may be snugly received by the bearing openings 16 to mount the supporting arms 17 for horizontal swinging movement. In order to provide means for normally swinging the arms 17 laterally inward to their inactive position the said free ends of the lever arms 19 are connected with one terminal of the coiled springs 21 arranged within the housing 10. In order to manually effect outward lateral swinging movement of said arms 17 to their active position, the said free ends of the lever arms 19 are connected by flexible elements or cables 22 to a depressible foot pedal 23 within convenient reach of the foot of the operator of the vehicle. The flexible elements or cables 22 are trained over guide sheaves 24 within the housing and a guide sheave 25 on the bearing bracket 26 for the foot pedal. By providing the blocks 15 and recess 14 in the front wall 13 and a plurality of bearing openings 16, it is obvious that the arms 17 may be selectively positioned within any pair of bearing openings 16 to accommodate the device to various conditions.

The means for mounting the device upon the vehicle comprises a pair of supporting legs 27 each of which includes a shank 28 insertable in receiving openings 29 which extend through the sides of the casing 10. Set screws 30 extend through intersecting threaded openings for engaging the shanks 28 to hold the supporting legs 27 in their adjusted positions. The supporting legs at their free ends are provided with clamp elements 31 which are designed to engage the axle B or any other convenient portion at the forward end of the vehicle A.

Figure 2:
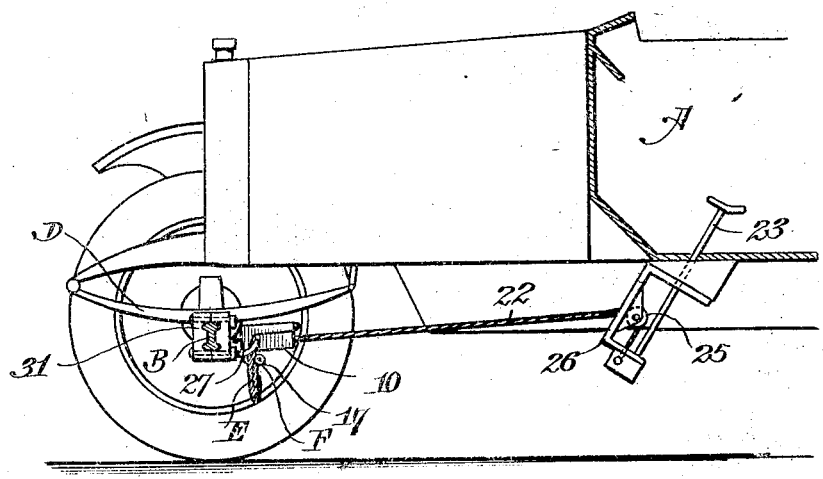
Figure 2 is a fragmentary longitudinal sectional view of the vehicle illustrating the attachment in side relation as applied thereto.

As illustrated in Figures 1 to 4 inclusive the supporting arms 17 have removably mounted thereon a fender E which is designed as a protective means for pedestrians and in this instance the forward free ends of the arms 17 have mounted thereon rollers F which are designed to engage with the road to support the forward end of the fender when the same is in its active position. Normally the arms are swung laterally inwardly and the fender E is folded as illustrated in Figures 1, 2 and 3. When the occasion arises for use of the fender, the operator depresses the foot pedal 23 thereby exerting a pull on the flexible elements or cables 22 and swinging the supporting arms 17 outwardly to their active laterally projected positions which disposes the fender E in a position in front of the front wheels of the vehicle to pick up a pedestrian and prevent him from falling under the wheels. When not in use the springs 21 function to swing the arms 17 and fender E to their inactive position and to return the foot pedal to its normal position.

In Figure 5 the supoprting arms 17 are illustrated in their alternative use as supporting at their free ends brushes G which are designed to engage the road bed immediately in advance of the wheels for the purpose of removing from the path of the tires glass or any other object which would be likely to puncture the tire. Ordinarily the arms 17 are swung laterally inward to an inactive position and are only swung outwardly when the occasion demands. It is of course to be understood that the housing 10 may be disposed in front, in rear or below the front axle or if desired the same may be supported from the front end of the chassis of the vehicle.

From the foregoing it will thus be seen that a comparatively simple and inexpensive attachment for motor vehicles has been provided which affords a foldable or collapsible means for supporting protective devices from the forward end of a motor vehicle.

I claim:

1. A collapsible or foldable means for supporting a protective device from the forward end of a motor vehicle, said means comprising a housing, a pair of arms pivoted thereto adjacent the opposite ends thereof, means within the housing for normally swinging the arms laterally inward to an inactive position underlying the forward portion of the housing and manual actuating mechanism operatively connected with said arms for swinging the same to their active position whereby they project laterally outward at a forward angle with their terminals disposed in advance of the wheels.

2. A collapsible or foldable means for supporting a protective device from the forward end of a motor vehicle, said means comprising a housing, a pair of arms pivoted thereto adjacent the opposite ends thereof, means within the housing for normally swinging the arms laterally inward to an inactive position underlying the forward portion of the housing and manual actuating mechanism operatively connected with said arms for swinging the same to their active position whereby they project laterally outward at a forward angle with their terminals disposed in advance of the wheels and means for adjusting the point of pivotal connection between each arm and the housing.

3. An attachment for motor vehicles for supporting a protective device from the forward end thereof comprising a housing, a pair of supporting arms pivotally connected to the housing adjacent its opposite ends, said arms having portions extending into the housing, means connected with said portions for swinging the arms laterally inward to an inactive position, a pair of flexible elements connected with said portions of the arms and manually operable means arranged adjacent the driver's seat and connected with said flexible elements for swinging said arms laterally outward to their active position.

4. An attachment for motor vehicles for supporting a protective device from the forward end thereof comprising a housing, a pair of supporting arms pivotally connected to the housing adjacent its opposite ends, said arms having portions extending into the housing, means connected with said portions for swinging the arms laterally inward to an inactive position, a pair of flexible elements connected with said portions of the arms and manually operable means arranged adjacent the driver's seat and connected with said flexible elements for swinging said arms laterally outward to their active position, and means for connecting said housing with the forward end of the vehicle to permit of angular adjustments of said housing.

5. In an attachment for motor vehicles for supporting fenders, roadbed sweepers or other protective devices from the forward end of the vehicle, a housing having means for adjustably connecting the same with the forward end of the vehicle, a pair of supporting arms for said devices having vertically offset shanks, a plurality of bearing openings within which said shanks are selectively mounted for pivotally associating the arms with the housing, lever arms extending from said shanks into the housing, springs connected with said lever arms for normally moving the supporting arms laterally inward to an inactive position and manually operable means connected with said lever arms for manually throwing said arms laterally outward to an active position.

JOHN J. KILBRIDE.